United States Patent Office 3,716,500
Patented Feb. 13, 1973

3,716,500
TOBACCO SMOKE FILTER MATERIAL
Elmer Francis Litzinger, Louisville, Ky., assignor to Brown & Williamson Tobacco Corporation, Louisville, Ky.
No Drawing. Filed Sept. 25, 1970, Ser. No. 75,772
Int. Cl. A24d *1/06;* C08g *9/04*
U.S. Cl. 260—2.1 C                                     5 Claims

ABSTRACT OF THE DISCLOSURE

An improved tobacco smoke filter material is formed from the porous, particulate salt of a weakly basic anion exchange resin, said salt being formed by the at least partial neutralization of the basic resin by a weak acid.

---

This application is related to copending application Ser. No. 75,773 filed Sept. 25, 1970.

BACKGROUND OF THE INVENTION

Hitherto it has been proposed to employ in cigarette filters ion exchange resins for the purpose of removing various constituents from tobacco smoke, particularly nicotine, acids, and tar. Specifically, cation exchange resins have been proposed for nicotine removal and anion exchange resins for the removal of smoke acids. Strongly basic anion exchangers proposed for the latter purpose have no effect on smoke vapor phase aldehydes. Weakly basic ion exchange resins, in free base form or as strong, inorganic acid salts thereof, as smooth nonporous beads, or a powders dusted on tow, have similarly been proposed. The resin salts lack vapor phase filtration properties. The free bases, while effecting some degree of vapor removal, have an associated ammoniacal odor and undesirably influence the flavor of tobacco smoke.

SUMMARY OF THE INVENTION

It is, therefore, an object of the present invention to overcome the difficulties and disadvantages heretofore encountered and to provide an improved filter material for delivering to the mouth of the smoker a smoke stream of the desired composition having the desired organoleptic characteristics and from which selected volatile components have been removed while leaving in the smoke, or returning or delivering thereto, desired flavor and aroma imparting materials.

The above and other beneficial objects and advantages are obtained in accordance with the present invention by an improved tobacco smoke filter material comprising the porous, particulate salt of a weakly basic anion exchange resin, said salt being formed by the at least partial neutralization of the basic resin by a weak acid. It has been found that weakly basic anion exchange resins, particularly those with a significant proportion of primary amine groups, selectively remove tobacco smoke carbonyl compounds. The reaction is catalyzed by weak acids, and the utilization of the above anion exchange resins as salts of weak acids provides highly efficient filter material for the selective removal of volatile aldeyhdes, such as acetaldehyde and acrolein, from cigarette smoke while maintaining the capacity of the resin for filtering other components, such as hydrogen cyanide.

Enhanced selective filtration is obtained by employing a highly porous granular resin for exposing the active chemical functionality to the smoke stream.

The term "$pK_a$" as employed hereinbelow designates the first ionization constant of the weak acid used to convert the basic anion exchange resin (in free base form) to its salt form.

DESCRIPTION OF THE PREFERRED EMBODIMENTS

The anion exchange resin matrix of the weakly basic resin may be of the conventional polystyrene, styrene-divinylbenzene, phenolic, acrylic or aliphatic types. A preferred resin matrix is a phenol-formaldehyde condensate.

The weakly basic resin may be formed by combining, using conventional means, a polyamine with the previously described resin matrix. Substantial improvement is obtained in the selective filtration properties of the material when the weakly basic anionic exchange resin contains at least about 30% free primary amino groups prior to reaction with a weak acid in accordance with the invention.

Examples of typical polyamines include: ethylenediamine, diethylenetriamine, triethylenetetramine, tetraethylenepentamine, propylenediamine, meta-phenylenediamine and the like.

It is of critical importance that the weakly basic anion exchange resin be formed from porous and preferably granular particles, rather than conventional smooth, nonporous spherical resinous particles.

For best results the porous, granular resin particles are formed with a surface area of from about 1 to 100 square meters per gram. The pore volume of the granules is preferably from about 0.2 to 0.5 cubic centimeter per gram. The average pore diameter (assuming cylindrical pores) of the resin granules is preferably from about 0.01 to 1 micron.

Particularly preferred weakly basic anionic exchange resins capable of being at least partially neutralized by the weak acids of the invention are the porous, granular phenol-formaldehyde - polyamine terpolymer resins, designated Duolite A-2 and Duolite A-7 and distributed by Diamond Shamrock Chemical Company. The following table sets forth the physical characteristics of the A-2 and A-7 resins. In the table the surface area is expressed in terms of square meters per gram, the pore volume in cubic centimeters per gram, and the pore diameter in microns.

Physical Properties of Preferred Porous Ion Exchange Resins

|  | Surface area | Pore volume | Pore diameter |
|---|---|---|---|
| Duolite A-2 | 46 | 0.4 | 0.01–0.07 |
| Duolite A-7 | 36 | 0.3 | 0.01–0.15 |

The filter material of the invention is formed by neutralizing all or a portion of an aforementioned basic resin with a weak acid. Resin salts derived from acids conventionally designated as "strong" acids and from acids conventionally designated as "very weak" acids are generally not effective in removing volatile aldehydic components of tobacco smoke. In general, acids having a $pK_a$ below about 3.5 or above about 5.5 yield unsatisfactory reductions of aldehydic components. For best results and markedly superior aldehyde removal, acids having a $pK_a$ of from about 4 to 5 are employed.

Preferred weak acids include aromatic and aliphatic carboxylic acids having a $pK_a$ of from about 4 to 5 and include such aromatic carboxylic acids as benzoic acid, cinnamic acid and anisic acid and such aliphatic dicarboxylic acids as succinic acid and glutaric acid.

Further enhanced results are obtained and accordingly it is particularly preferred to employ aliphatic monocarboxylic acids, including the following: propionic acid, valeric acid, caproic acid, heptanoic acid, caprylic acid, and pelargonic acid.

Especially preferred weak acids which have proved to be most efficient in removing volatile components from tobacco smoke when combined with the above basic anion exchange resins are acetic acid and glutamic acid. Additional enhancement is obtained when the free basic resins derived from phenol-formaldehyde-polyamine terpolymers such as the Duolite A-2 and A-7 resins, are fully or partially neutralized by either acetic acid or glutamic acid.

By completely neutralizing the free base form of the resins of the invention with the weak acids of the invention, significant reductions of volatile components such as hydrogen cyanide, acetaldehyde and acrolein are achieved. In the case of the Duolite A-2 and A-7 resins neutralized with acetic acid or glutamic acid increased reductions of from 30 to 35% acetaldehyde and from 15 to 20% acrolein have been obtained based on reductions achieved by the free base resin prior to neutralization.

Even partial neutralization of the free base resin significantly reduces the quantity of volatile aldehydic compounds in tobacco smoke as compared to the quantity removed by the free base resins and also substantially reduces the ammoniacal odor often associated with the free base (amine-type) resins. The efficiency of a tobacco smoke filter employing material of the invention can be increased as to removal of volatile components and, particularly, the aforementioned aldehydes, by more completely neutralizing the free base resin and/or by employing larger quantities of the at least partially neutralized resin in the filter.

In general, sufficient quantities of the filter material of the invention are employed to significantly reduce the quantity of undesired volatile components normally present in tobacco smoke and, particularly, hydrogen cyanide, acetaldehyde, and acrolein. For this and other purposes it is preferred to employ from about 50 to 150 milligrams of the filter material in a filter for use in smoking articles such as cigarettes.

In one embodiment, a filter is prepared by encasing the filter material in an outer wrapper. The resulting filter may be employed alone or in combination with conventional cellulose acetate filters. Triple filters employing sequentially, the following filter sections—cellulose acetate, the filter material of the invention, and cellulose acetate, have proven particularly workable. The filter material may be used in conjunction with perforated cigarette paper, if desired, or filter ventilation means may be employed. In another embodiment the filter material may be dispersed, in granular form, either on paper or on cellulose acetate tow and encased in an outer wrapper.

The following examples are provided to further illustrate the nature of the invention and are not limitative of scope.

EXAMPLE I

In order to illustrate the effectiveness of the filter material of the invention certain salt and free base forms of two different phenol-formaldehyde-polyamine terpolymer resins were formed into filters for cigarettes.

Filter materials of the invention were formed from the phenol-formaldehyde-polyamine terpolymer resins identified as Duolite A-2 and Duolite A-7 anion exchange resins, distributed by the Diamond Shamrock Chemical Company. The resins are commercially obtainable in the form of a chloride-sulfate mixed salt. For test purposes portions of the mixed chloride-sulfate salt of the A-2 and A-7 resins were converted to the free base resin. Portions of the free base resin were converted to the acetate or glutamate salt by complete neutralization with acetic acid or glutamic acid.

The neutralization capacities of the A-2 and A-7 resins are ca. 5.0 milliequivalents of weak acid per gram of resin. Predetermined quantities of the resin derivatives were packed into 7 millimeter cavities between 7 millimeter lengths of conventional cellulose acetate filters of 84 millimeter cigarettes, (tobacco sections 63 millimeters in length). The resulting cigarettes were smoked to 28 millimeter butt lengths on a constant vacuum smoking machine taking 35 milliliter puffs of 2 seconds duration at one minute intervals.

In the following table the weight of the filter material is expressed in milligrams. The filter efficiency represents the weight percent of component trapped by the filter material based on the total amount of the component passing through the cigarette filter.

SELECTIVE FILTRATION EFFICIENCIES

| Resin | Form | Resin weight | Hydrogen cyanide | Acetaldehyde | Acrolein |
|---|---|---|---|---|---|
| Duolite A-2 | Unmodified (chloride-sulfate salt) | 130 | 27 | 3 | 19 |
|  | Free base | 120 | 82 | 49 | 52 |
|  | Acetate salt | 120 | 80 | 79 | 72 |
|  | Glutamate salt | 140 | 84 | 75 | 71 |
| Duolite A-7 | Unmodified (chloride-sulfate salt) | 145 | 49 | 0 | 35 |
|  | Free base | 125 | 81 | 31 | 56 |
|  | Acetate salt | 140 | 80 | 66 | 70 |

The free base resin forms exuded a perceptible ammoniacal odor. This odor was eliminated by the formation of the acetate and glutamate salts of the above resins. The above table illustrates the significant enhancement in removal of volatile components, particularly aldehydic components, from tobacco smoke obtained by employing the filter materials of the invention. Similar results are obtained when other weakly basic anion exchange resins, at least partially neutralized with weak acids, are employed.

In the following table any of the resin matrixes may be combined with any of the polyamines to form the weakly basic exchange resin of the invention and such resins may be at least partially neutralized with any of the following weak acids:

| Resin matrix | Polyamine | Weak acid |
|---|---|---|
| Polystyrene | Ethylenediamine | Glutaric. |
| Styrene-divinylbenzene | Diethylene triamine | Succinic. |
| Aliphatic | Triethylene tetramine | Propionic. |
| Phenolic |  | Pelargonic. |
|  | Tetraethylene pentamine | Benzoic. |
|  | Meta-phenylenediamine |  |

EXAMPLE II

In order to illustrate the enhanced selective filtration results obtained in employing the weak acid salts of the weakly basic anion exchange resins, the phenol-formaldehyde-polyamine terpolymer resin (designated Duolite A-2 resin) of Example I was completely neutralized to form the salts enumerated in the table set forth hereunder. The resin salts were formed into filters in the manner set forth in Example I and tested and reported according to the procedure of Example I. The term $pK_a$ designates the first ionization constant of the weak acid used to convert the free base to its salt form.

Effect of $pK_a$ of Weak Acid on Selective Filtration Efficiency

| Form of resin | Resin weight | Filtration efficiency | | $pK_a$ |
|---|---|---|---|---|
|  |  | Acetaldehyde | Acrolein |  |
| Phosphate salt | 138 | 2 | 12 | 2.12 |
| Borate salt | 118 | 35 | 23 | 9.14 |
| Oxalate salt | 137 | 0 | 23 | 1.23 |
| Succinate salt | 134 | 50 | 47 | 4.16 |
| Citrate salt | 130 | 8 | 25 | 3.08 |
| Acetate salt | 120 | 79 | 72 | 4.75 |
| Glutamate | 140 | 75 | 71 | 4.07 |

As shown by the foregoing table strong and very weak acid salts are ineffective in removing volatile components such as aldehydes from tobacco smoke. Weak acids, particularly those having a $pK_a$ in the range of from about 4 to 5, show significantly enhanced selective filtration properties. This effect is dramatized by comparing the filtration efficiencies of the oxalate salt with the succinate salt. While both acids form dicarboxylate resin salts, nevertheless, the succinate salt ($pK_a$-succinic acid—4.16) exhibits a marked improvement in removal of aldehydes from tobacco smoke as compared with the oxalate salt (pK$_a$-oxalic acid—1.23).

EXAMPLE III

The effect of the physical properties of the resin salts on selective filtration are demonstrated in the following example. With the exception of the Duolite A–7 acetate resin, the acetate salts of the weakly basic anion exchange resins set forth in the following table were employed in the form of smooth, non-porous beads. The resins were formed into filters and tested and reported in accordance with procedures in Example I.

The Dowex–3 resin is a styrene-divinylbenzene polyamine resin. Amberlite IR–4B is a phenol-formaldehyde polyamine resin. Permutit de-Acidite is an aliphatic polyamine resin. The resins were *fully* neutralized to the acetate salt.

Effect of Physical Properties of Resin on Selective Filtration

| Resin | Resin weight | Filtration efficiencies | | |
|---|---|---|---|---|
| | | Hydrogen cyanide | Acetaldehyde | Acrolein |
| Duolite A–7 | 140 | 80 | 66 | 70 |
| Dowex–3 | 215 | 36 | 0 | 21 |
| Amberlite IR–4B | 196 | 29 | 0 | 16 |
| Permutit de-Acidite | 218 | 30 | 0 | 11 |

It is seen from the above table that the physical properties of the resin are of critical importance in determining its effectiveness in removing volatile components from tobacco smoke. The smooth, non-porous resin salts tested were ineffective in removing volatile components in comparison with the porous granular Duolite A–7 resin salt. The porous, granular resin was about 2½ times more effective than the non-porous, spherical beaded resins in removing hydrogen cyanide. The non-porous smooth resins were ineffective in removing acetaldehyde. The non-porous resins were at best, only one third as effective as the porous particulate resin in removing acrolein from tobacco smoke.

EXAMPLE IV

In order to determine the effectiveness of the partially neutralized weakly basic anion exchange resins of the invention, the Duolite free base resins derived from the mixed chloride-sulfate salts heretofore disclosed in Example I was thereafter neutralized with varying quantities of acetic acid. The resulting filter material was formed into a filter and tested according to the procedures of Example I. Each filter contained from 120 to 160 milligrams of resin. The neutralization capacity of the Duolite A–7 free base resins is 5 milliequivalents acetic acid per gram of resin. The effect of resin weight on the efficiency of the partially neutralized Duolite filters is also tabulated.

Effect of Neutralization on Filtration Efficiencies

| | Neutralization (meq. acid/g. resin) | Filtration efficiencies | | |
|---|---|---|---|---|
| | | Hydrogen cyanide | Acetaldehyde | Acrolein |
| Duolite A–7 | 0.0 | 81 | 31 | 56 |
| | 1.0 | 81 | 52 | 65 |
| | 2.0 | 80 | 56 | 67 |
| | 3.0 | 76 | 55 | 66 |
| | 5.0 | 80 | 66 | 70 |
| Duolite A–2 | 0.0 | 82 | 49 | 52 |
| | 1.0 | 80 | 63 | 66 |
| | 2.0 | 80 | 67 | 73 |
| | 3.0 | 80 | 77 | 78 |
| | 5.0 | 80 | 79 | 72 |

The completely neutralized Duolite resins were 30–35% more efficient for acetaldehyde and 15–20% more efficient for acrolein than the free bases. Partial neutralization of Duolite A–7 free base (1.0–3.0 meq./g.) enhanced acetaldehyde and acrolein efficiencies by 20–25% and about 10%, respectively.

The following resins were converted to their free base form and thereafter were partially neutralized with 2 milliequivalents of acetic acid. Each resin salt was intermixed with cellulose triacetate granules to simulate resin dispersed on cellulose acetate tow. Each mixture was formed into 13 mm. filter beds and joined with an 8 mm. cellulose acetate filter. The dual filter was joined to a tobacco cylinder and tested according to Example I.

Effect of Resin Weight on Efficiency of Partially Neutralized Duolite Filters

| | Resin weight (mgs.) | Filtration efficiencies | | |
|---|---|---|---|---|
| | | Hydrogen cyanide | Acetaldehyde | Acrolein |
| Duolite A–7 | 50 | 60 | 30 | 44 |
| | 100 | 71 | 46 | 50 |
| Duolite A–2 | 50 | 62 | 37 | 44 |
| | 100 | 72 | 54 | 62 |

It will be seen that removal of volatile components, particularly acetaldehyde and acrolein, is enhanced either by more fully neutralizing the free base resin or by employing increasing quantities of filter material. Similar results are obtained for other weakly basic anion exchange resins neutralized with the weak acids of the invention.

This invention is not to be limited except as set forth in the following claims.

Having thus described my invention, what is claimed is:

1. An improved tobacco smoke filter material comprising the porous, granular salt of a weakly basic anion exchange resin, said resin characterized by a surface area of from about 1 to 100 square meters per gram, a pore volume of from about 0.2 to 0.5 cubic centimeter per gram, and an average pole diameter of from about 0.01 to 1 micron, said salt being formed by the at least partial neutralization of the basic resin by a weak acid having a pK$_a$ between about 3.5 and 5.5.

2. The material of claim 1 in which the acid employed for neutralization has a pK$_a$ between about 4 and 5.

3. The material of claim 2 in which the acid is selected from the group consisting of acetic acid and glutamic acid.

4. The material of claim 3 in which the weakly basic anion exchange resin is a phenolformaldehyde-polyamine terpolymer resin.

5. The tobacco smoke filter material of claim 1 wherein the weakly basic anion exchange resin contains at least about 30 percent free primary amino groups prior to reaction with the weak acid.

References Cited

FOREIGN PATENTS 1,032,330  6/1966  Great Britain.

OTHER REFERENCES

Kunin et al., J. Am. Chem. Soc. 69, 2874–76 (1947).
Calmm & Kressman, Ion Exchangers in Organic and Biochemistry, Interscience, N.Y., 1957, pp. 120–21, 262–63, 266–67, 274–75, 650.
Helfferich, Ion Exchange, McGraw-Hill, New York, 1962 (pp. 6–7).
Hersiczky et al., Staerke 18(1), 6–10 (1966); Kadyrov et al., Massoobmennye Protsessy Khim. Tekhnol., 1969, No. 4, 121–22; Brykina et al., Vestn. Mosk. Univ., Khim., 1969, 24(3), 109–12; Seno et al., Bull. Chem. Soc. Japan 34, 1021–26 (1961); Zhushman, Tr. Vses. Nauchn-Issled. Inst. Krakhmaloproduktov 1964 (7), 11–16; Khromova et al., Zh. Fiz. Khim. 43, 12–38–43 (1969); Inczedy, Magy. Kem. Lapja 23(11), 621–23 (1968).

MELVIN GOLDSTEIN, Primary Examiner

U.S. Cl. X.R.

131—262 A; 260—2.1 R, 2.1 E